(12) United States Patent
Takada

(10) Patent No.: US 7,764,031 B2
(45) Date of Patent: Jul. 27, 2010

(54) AC-INPUT TYPE BRUSHLESS DC MOTOR AND ELECTRIC APPLIANCE MOUNTING THE SAME

(75) Inventor: Masayuki Takada, Aichi (JP)

(73) Assignee: Panasonic Corporation, Osaka (JP)

( * ) Notice: Subject to any disclaimer, the term of this patent is extended or adjusted under 35 U.S.C. 154(b) by 8 days.

(21) Appl. No.: 12/295,956

(22) PCT Filed: Jun. 26, 2007

(86) PCT No.: PCT/JP2007/062781

§ 371 (c)(1),
(2), (4) Date: Oct. 3, 2008

(87) PCT Pub. No.: WO2008/001759

PCT Pub. Date: Jan. 3, 2008

(65) Prior Publication Data

US 2009/0108785 A1 Apr. 30, 2009

(30) Foreign Application Priority Data

Jun. 29, 2006 (JP) .............................. 2006-179151

(51) Int. Cl.
*H02P 6/10* (2006.01)
(52) U.S. Cl. .............................. 318/400.07; 318/400.17; 318/400.27; 318/400.3
(58) Field of Classification Search ................ 318/400.01–400.07, 400.15, 400.17, 400.2, 318/400.22, 400.26–400.28, 400.3, 700, 318/720–724, 430–434
See application file for complete search history.

(56) References Cited

U.S. PATENT DOCUMENTS

| 4,316,132 A | * | 2/1982 | Geppert ...................... 318/723 |
| 4,857,819 A | * | 8/1989 | Maurice et al. ............. 318/778 |
| 5,739,650 A | * | 4/1998 | Kimura et al. ......... 318/400.07 |
| 2008/0303464 A1 | | 12/2008 | Takada |

FOREIGN PATENT DOCUMENTS

| JP | 2000-041370 A | 2/2000 |
| JP | 2000-041395 A | 2/2000 |
| JP | 2002-010609 A | 1/2002 |
| JP | 2003-284307 A | 10/2003 |
| JP | 2005-176474 | 6/2005 |
| JP | 2005-204398 A | 7/2005 |
| JP | 2006-115690 | 4/2006 |
| JP | 2006-149048 | 6/2006 |
| JP | 2006-149048 A | 6/2006 |
| KR | 10-2008-7027011 | 12/2009 |

OTHER PUBLICATIONS

International Search Report for PCT/JP2007/062781, Oct. 2, 2007.

* cited by examiner

*Primary Examiner*—Bentsu Ro
(74) *Attorney, Agent, or Firm*—RatnerPrestia

(57) ABSTRACT

In an AC-input type brushless DC motor, a current control circuit controls an average current of an inverter circuit, a current indication circuit makes addition or subtraction, with respect to a reference current value, to the average current to be supplied to the inverter circuit such that the average current falls into a correlation indicated by a correlation indication circuit. The foregoing structure allows setting speed-torque characteristics of the brushless DC motor such that the torque increases at a higher rpm of the motor. The characteristics are good for driving a fan.

10 Claims, 13 Drawing Sheets

AC-INPUT TYPE BRUSHLESS DC MOTOR AND ELECTRIC APPLIANCE MOUNTING THE SAME

This Application is a U.S. National Phase Application of PCT International Application PCT/JP2007/062781.

TECHNICAL FIELD

The present invention relates to an AC-input type brushless DC motor, and an electric appliance using the same motor.

BACKGROUND ART

In recent years, an AC-input type brushless DC motor has been increasingly used as a motor for driving a fan of ventilating devices, and it replaces a conventional induction motor for the better efficiency. FIG. 11 shows an example of AC-input type brushless DC motors (refer to patent document 1.) Rectifier 101 rectifies an AC power supply and obtains a high DC voltage, and then DC-DC converter 110 converts the high DC voltage into a low DC voltage, which is applied to motor coils 103 and 104. Based on a signal supplied from a rotor position sensing circuit, switching elements 107 and 108 control electric currents running through motor coils 103 and 104.

Smoothing capacitors are placed before and after DC-DC converter 110. In this case, fairly large capacitive aluminum electrolytic capacitors 109 and 111, in which electrolyte is impregnated, are used as the smoothing capacitors. However, the aluminum electrolytic capacitor is changed its characteristics by an ambient temperature.

FIG. 12 shows a comparison between a brushless DC motor and an induction motor when they drive a fan. FIG. 13 shows air-volume-static-pressure characteristics in the case shown in FIG. 12. The induction motor, as shown in FIG. 12, works during the period between P1 and P2 along curve ST1 of speed-torque characteristics. Reference marks "L1" and "L2." represent load curves of the fan at static pressure=0 and static pressure=max.

When this induction motor is replaced with a brushless DC motor of which speed-torque characteristics is shown as curve ST2, the maximum static pressure stays the same as that of the induction motor; however, the air volume at working point P3 during the static pressure=0 (zero) becomes rather greater. As a result, the motor produces greater noises and vibrations. To the contrary, when speed-torque characteristics goes along curve ST3, the air volume stays the same as that of the induction motor; however, the maximum static pressure at working point P4 during the static pressure=0 (zero) becomes rather lower. In such a case, if the wind outside the appliance changes a pressure loss, the air volume also changes greatly.

In order to overcome these problems discussed above, the speed-torque characteristics of the brushless DC motor to be used for driving the fan is preferably similar to that of the induction motor, and the torque preferably increases at the greater speed.

Patent Document 1: Unexamined Japanese Patent Application Publication No. 2003-284307

DISCLOSURE OF INVENTION

An AC-input type brushless DC motor of the present invention comprises the following elements:
  an inverter circuit;
  a voltage converting circuit for converting a high DC voltage obtained by rectifying an AC power supply into a low DC voltage;
  a driving logic circuit for applying the low DC voltage to the motor via the inverter circuit;
  a current control circuit for controlling an average current at a typically constant value before the current is supplied to the inverter circuit;
  a current indication circuit for indicating an average current value;
  a correlation indication circuit for indicating a correlation between the low DC voltage and the average current value; and
  a reference current indication circuit for determining a reference current value indicated by the current indication circuit. The current indication circuit increases or decreases the average current value to be supplied to the inverter circuit with respect to the reference current value so that the average current can satisfy the correlation discussed above.

An AC-input type brushless DC motor of the present invention having the foregoing structure allows obtaining such speed-torque characteristics as obtains greater torque at a higher motor speed. As a result, a fan can be driven free from great change in air volume even if a pressure loss changes.

DESCRIPTION OF REFERENCE MARKS

Figure 1:
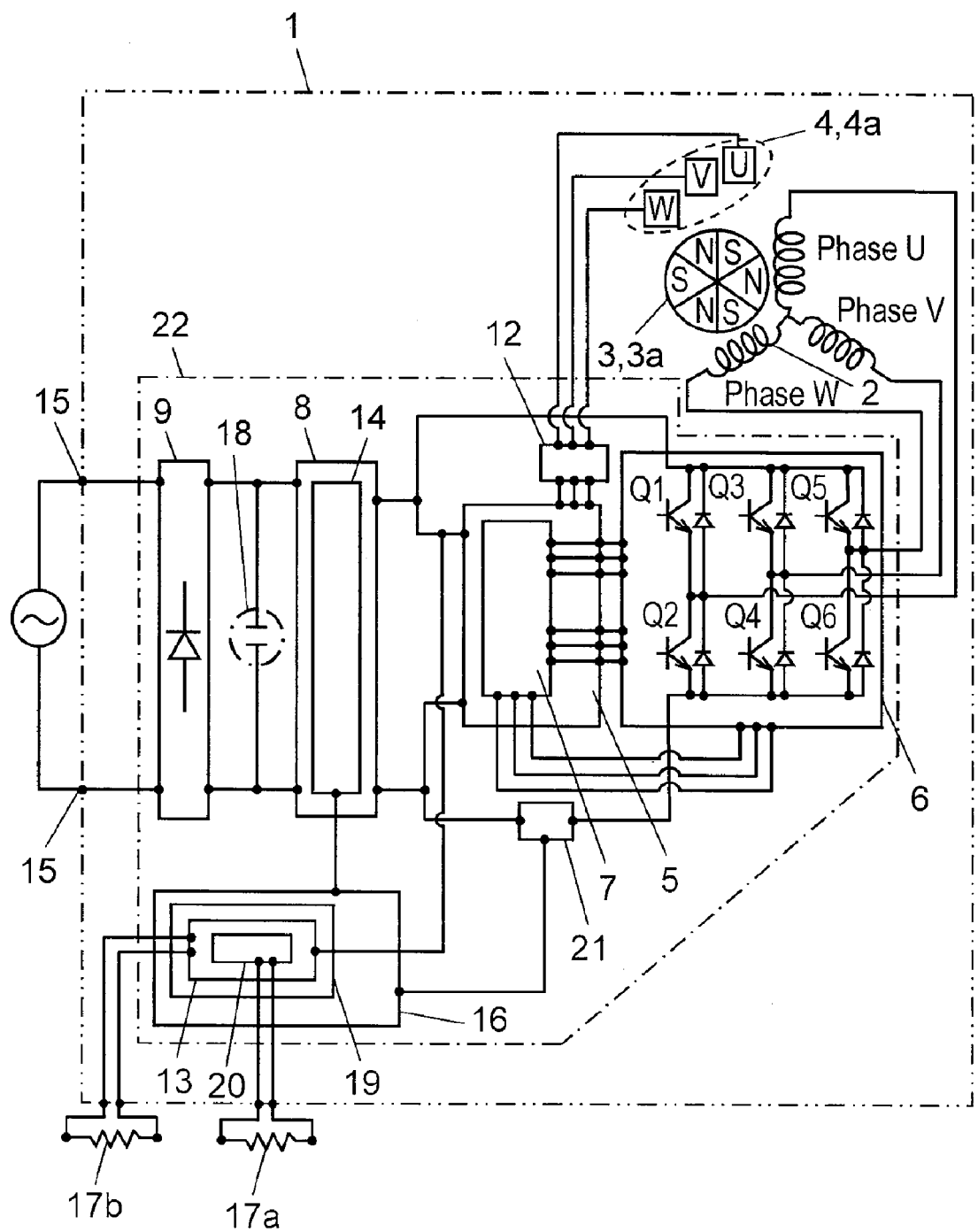
FIG. 1 shows a block diagram illustrating an AC-input type brushless DC motor in accordance with a first embodiment of the present invention.
Figure 2:
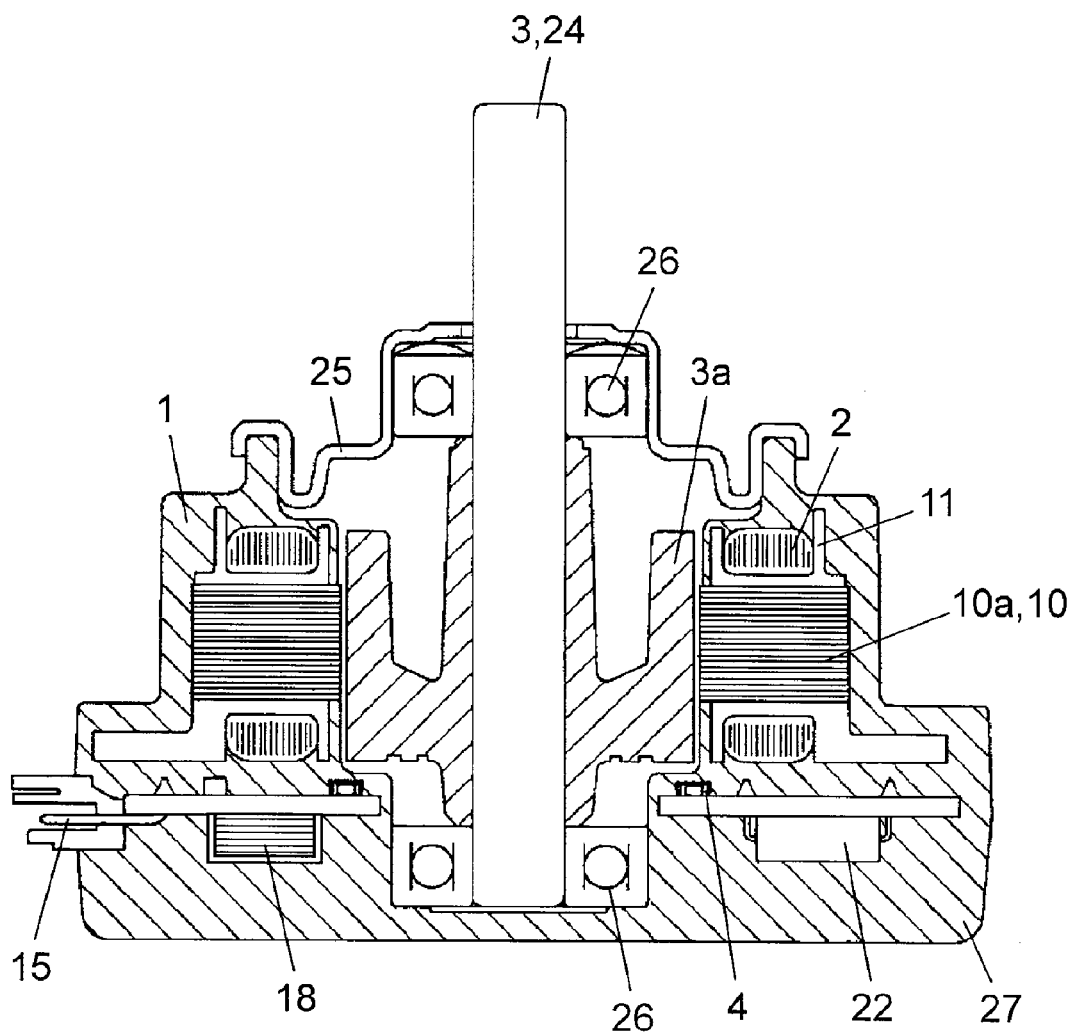
FIG. 2 shows a sectional view of the brushless DC motor shown in FIG. 1.

| | |
|---|---|
| 1 | AC-input type brushless DC motor |
| 2 | driving coil |
| 3 | magnet rotor |
| 3a | polar-anisotropic magnet |
| 4 | position sensing circuit |
| 4a | magnetism sensor |
| 5 | driving logic circuit |
| 6 | inverter circuit |

-continued

| | |
|---|---|
| 7 | current waveform control circuit |
| 8 | voltage converting circuit |
| 9 | rectifying circuit |
| 10 | stator |
| 12 | waveform synthesizer circuit |
| 13 | correlation indication circuit |
| 16 | current control circuit |
| 17a, 17b | resistor |
| 19 | current indication circuit |
| 20 | reference current indication circuit |
| 28 | ventilating device (electric appliance) |
| 30 | AC-input type brushless DC motor |
| 31 | duty indication circuit |
| 32 | PWM control circuit |
| 33 | current waveform control circuit |
| 34 | driving logic circuit |
| 35 | voltage converting circuit |
| Q1, Q2, Q3, Q4, Q5, Q6 | switching elements |

DESCRIPTION OF PREFERRED EMBODIMENTS

Exemplary embodiments of the present invention are demonstrated hereinafter with reference to the accompanying drawings.

Exemplary Embodiment 1

As shown in FIG. 1-FIG. 7, AC-input type brushless DC motor 1 includes stator 10 formed by winding driving coil 2 on stator iron core 10a, which has multiple slots, via insulating member 11. Stator 10 is molded of thermosetting resin 27 for forming a jacket, and supports bearing 26 with bracket 25.

Magnet rotor 3 formed by injection-molding a multi-pole oriented magnet 3a, made of anisotropic plastic magnet, unitarily together with shaft 24. Position sensing circuit 4 for sensing a position of magnet rotor 3 includes magnetism sensor 4a such as a Hall element for sensing a distribution of magnetic flux of magnet rotor 3. Magnetism sensor 4a is placed through setting a space between sensor 4a and magnet rotor 3 such that a waveform to be sensed becomes similar to an induced voltage waveform induced on driving coil 2 by magnet rotor 3.

Waveform synthesizer circuit 12 carries out the following three subtractions: Subtract phase-V waveform from phase-U waveform of magnetism sensor 4a in order to remove harmonic component of an electric current to be supplied to phase-U of driving coil 2; in a similar way, subtract phase-W waveform from phase-V waveform of magnetism sensor 4a in order to remove harmonic component from the electric current to be supplied to phase-V of driving coil 2; and subtract phase-U waveform from phase-W waveform of magnetism sensor 4a in order to remove harmonic component from the electric current to be supplied to phase-W of the driving coil.

Switching elements Q1-Q6 are bridge-coupled together, thereby forming inverter circuit 6. Driving logic circuit 5 controls ON and OFF of switching elements Q1-Q6 so that driving coils 2 undergo full-wave excitation in a predetermined direction and sequence. Current waveform control circuit 7 adjusts an output bias current while it feeds back such that switching elements Q1-Q6 become a non-saturated but almost saturated state so that each phase current of driving coils 2 becomes typically similar to the waveform removed its harmonic component by waveform synthesizer circuit 12.

The commercial AC power source is connected to coupling terminal 15. Rectifying circuit 9 rectifies the AC power supply in a full-wave manner, and voltage converting circuit 8 is formed of a chopper circuit, and converts a high voltage, having undergone the full-wave rectification of rectifying circuit 9 and including ripples, into a low DC voltage not higher than 45V. The low DC voltage converted by voltage converting circuit 8 is applied to AC-input type brushless DC motor 1 via inverter circuit 6. A polymer capacitor is placed between voltage converting circuit 8 and rectifying circuit 9 in order to compensate a voltage when AC 100V of 50 Hz stays lower than 45V during the full-wave rectification. This polymer capacitor works as smoothing capacitor 18 having small capacitance.

Current sensing circuit 21 senses an electric current of inverter circuit 6. Current control circuit 16 controls low DC voltage changing circuit 14, thereby changing a voltage supplied from voltage converting circuit 8 so that an average current of inverter circuit 6 can become similar to a current indicated by current indication circuit 19. Reference current indication circuit 20 indicates a reference value of a current value indicated by current indication circuit 19. The reference value is determined in response to a resistor value formed by combining resistor 17a coupled to the outside of the motor with an internal resistance of reference current indication circuit 20.

Figure 3:
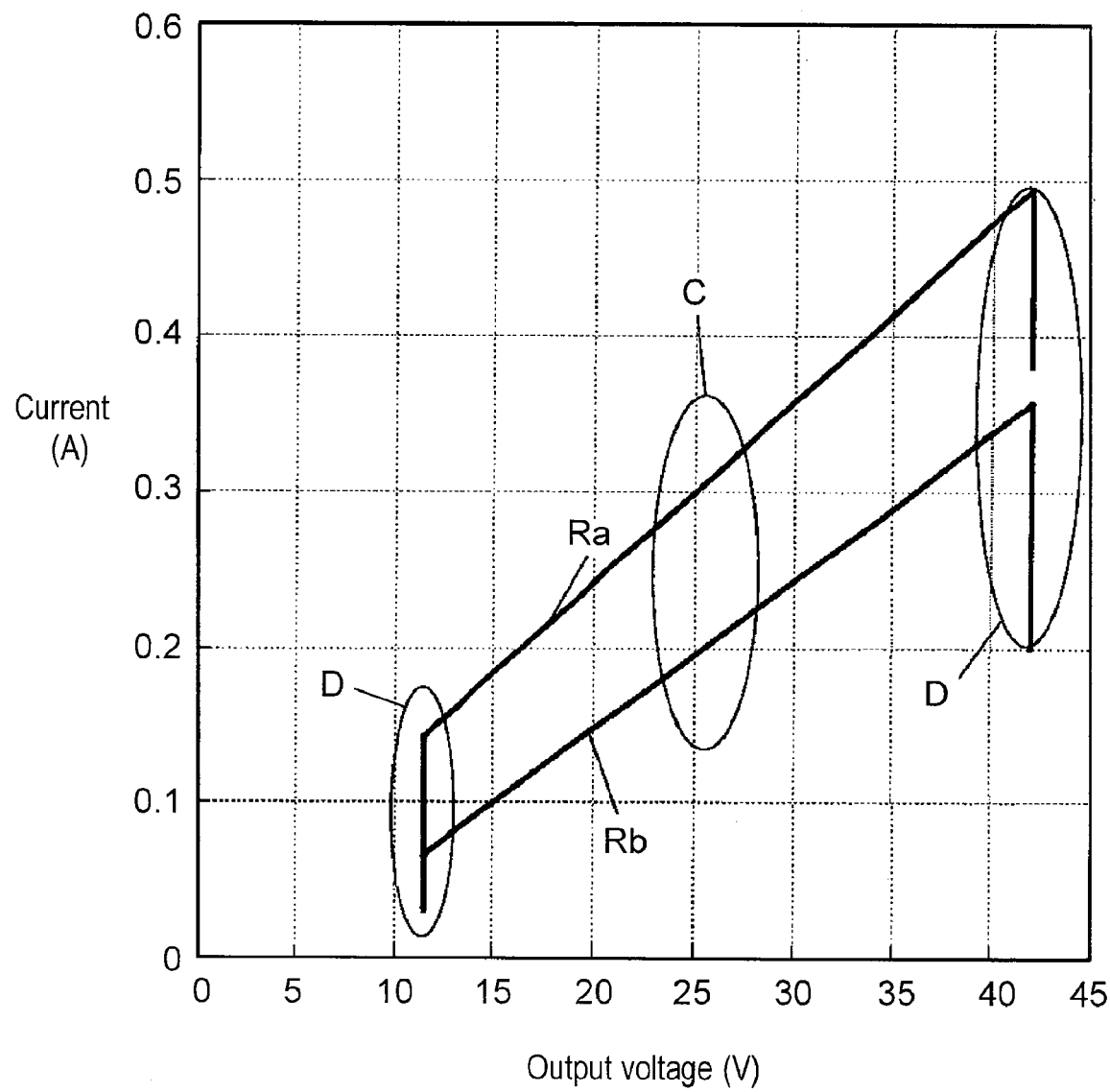
FIG. 3 shows output-voltage-current characteristics of a low DC voltage converting circuit of the brushless DC motor shown in FIG. 1.

Correlation indication circuit 13 makes addition or subtraction to the current, supplied to inverter circuit 6, with respect to the reference value in response to an output voltage from voltage converting circuit 8, and then leaves instructions for current indication circuit 19 such that the output-voltage-current characteristics of circuit 8 can become the characteristics shown in FIG. 3. A proportion of addition or subtraction with respect to the reference value is determined in response to a resistor value of resistor 17b coupled outside the motor. An upper limit of the low DC voltage to be applied to inverter circuit 6 is set considering a withstanding voltage as well as a kick-back voltage of inverter circuit 6, so that the motor can be driven at a constant voltage and the current can be not controlled during this period. Reference marks "C" and "D" shown in FIG. 3, and FIGS. 4, 6, 7 which are described later, represent respectively a period where a voltage and a current are controlled, and a period where a voltage is kept constant when the motor is driven.

Figure 5:
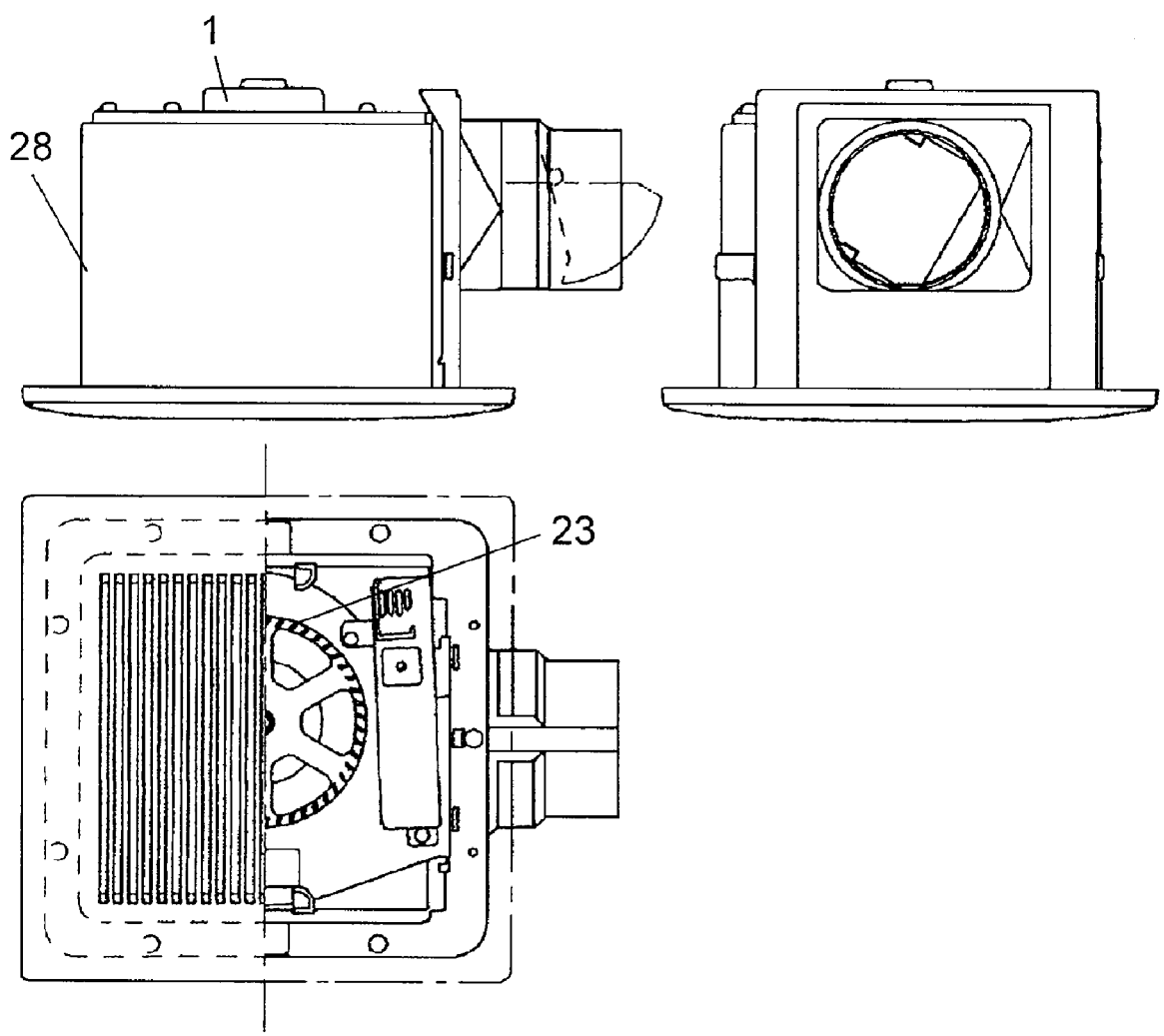
FIG. 5 shows a ventilating device in which the brushless DC motor as shown in FIG. 1 is mounted.

In FIG. 1, the circuit surrounded by an alternate long and short dash line, excluding smoothing capacitor 18, coils and smoothing capacitor on the second side (not shown), forms integrated circuit 22 mounted on a substrate made of alumina, aluminum, or copper. FIG. 5 shows an electric appliance, e.g. ventilating device 28 which includes AC-input type brushless DC motor 1 and fan 23.

Figure 4:
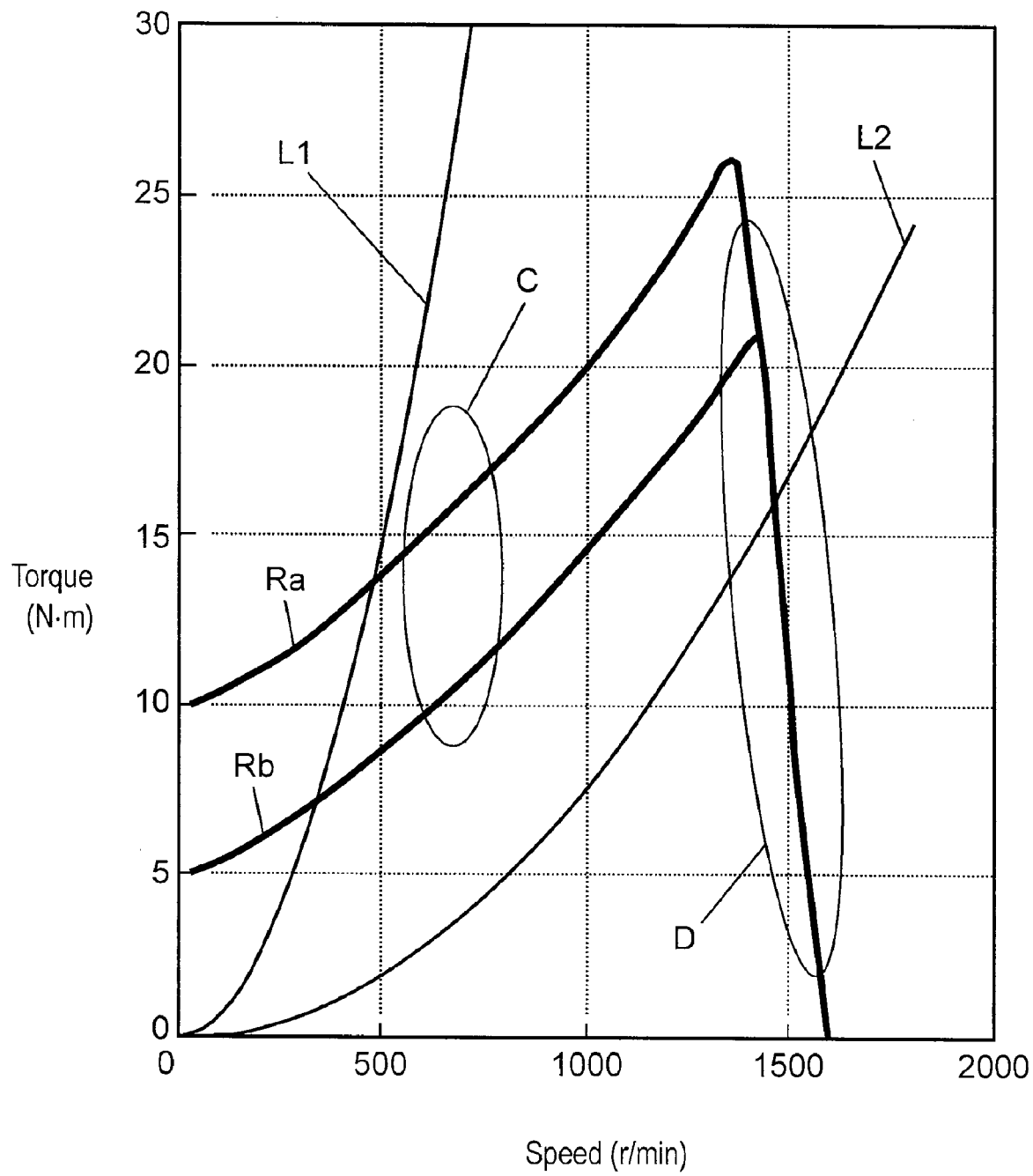
FIG. 4 shows speed-torque characteristics of the brushless DC motor shown in FIG. 1.
Figure 6:
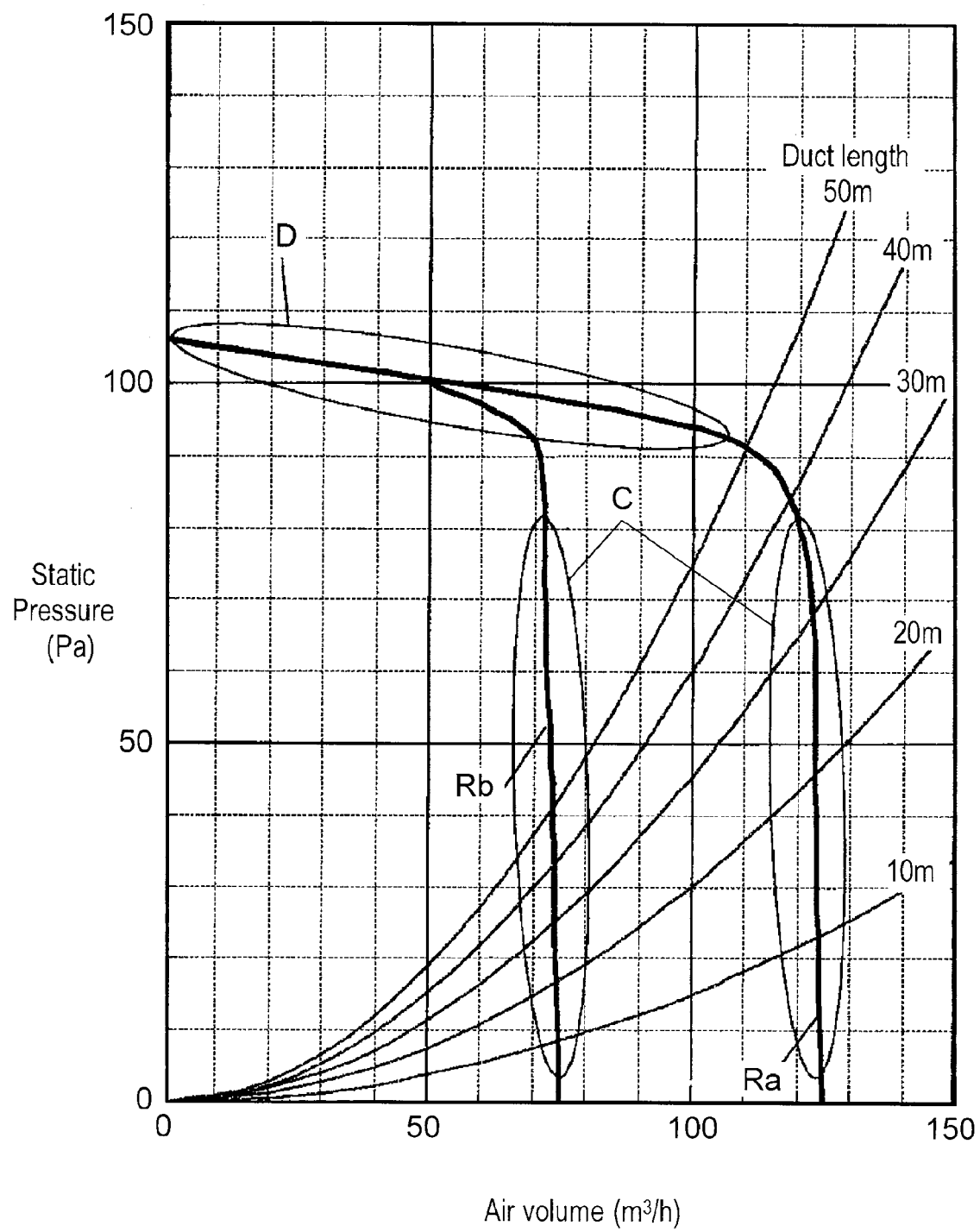
FIG. 6 shows air-volume-static-pressure characteristics of the ventilating device in which the brushless DC motor as shown in FIG. 1 is mounted.

In AC-input type brushless DC motor 1 of the present invention, correlation indication circuit 13 makes addition or subtraction, with respect to the reference value, to the current to be supplied to inverter circuit 6 in response to an output voltage supplied from voltage converting circuit 8, thereby leaving instructions for current indication circuit 19. Thus a greater current at a higher rpm, and a smaller current at a lower rpm can be expected. As shown in FIG. 4, the speed-torque characteristics of the motor becomes such that greater shaft torque can be obtained at a greater rpm. In FIG. 4, reference marks "L1" and "L2" represent respectively a load curve at static pressure=0 (zero) and at static pressure=maximum value. The foregoing characteristics allow ventilating device 28 to obtain the air-volume-static-pressure characteristics that produce no substantial change in air-volume even if a pressure loss changes, e.g. a change occurs in an outer wind-pressure or in a duct length, as shown in FIG. 6. A change amount by the addition or subtraction can be set appropriately such that the speed-torque characteristics can show an optimum incline.

Selection of one of Ra or Rb as resistor 17a to be connected to reference current indication circuit 20 allows adjusting the speed-torque characteristics of the motor upward or downward as shown in FIG. 4. As a result, as shown in FIG. 6, the selection of one of Ra or Rb allows adjusting an air volume of ventilating device 28 with ease.

Figure 7:
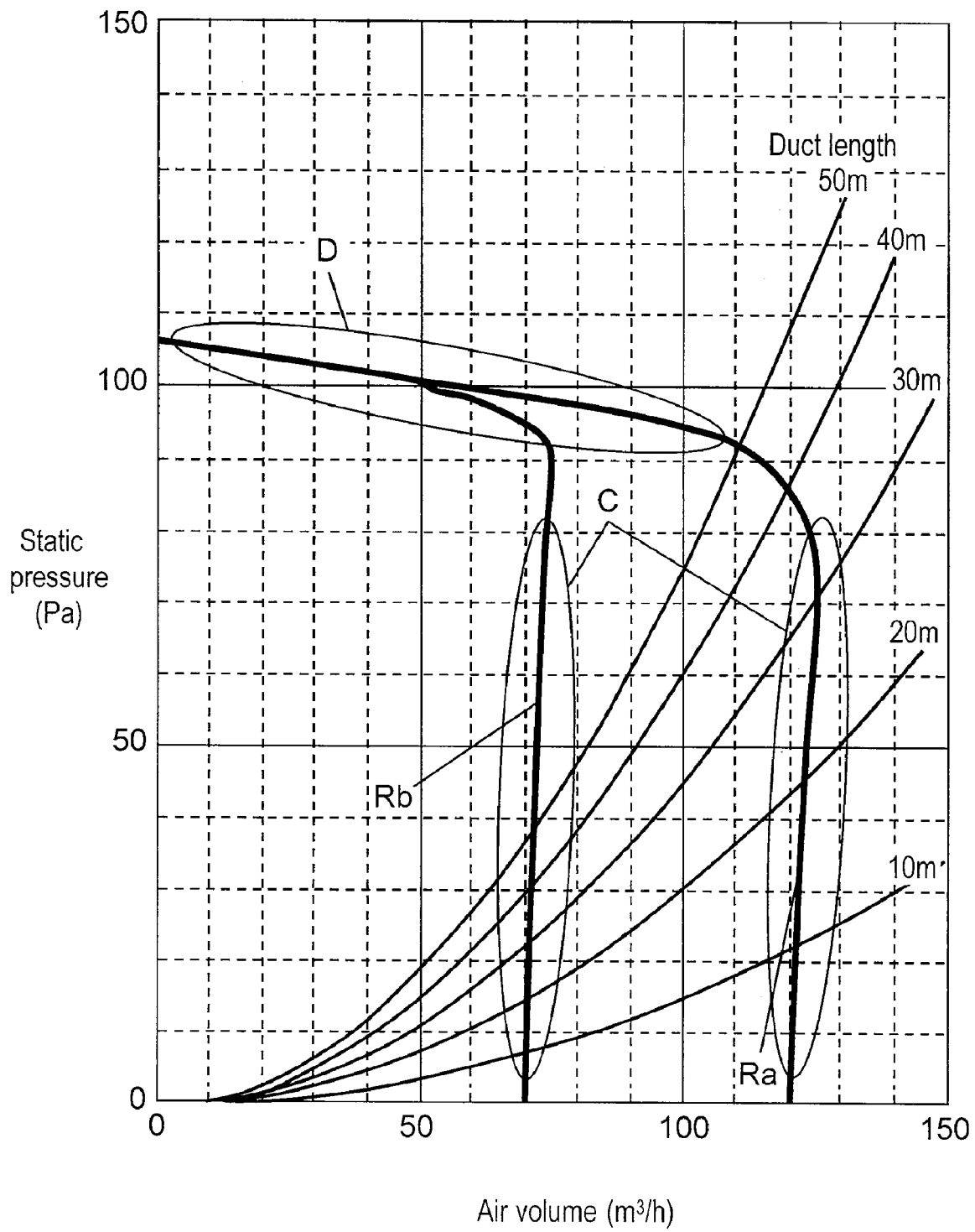
FIG. 7 shows another air-volume-static pressure characteristics of the ventilating device in which the brushless DC motor as shown in FIG. 1 is mounted.

Selection of a resistor value of resistor 17b to be connected to correlation indication circuit 13 allows adjusting arbitrarily an incline of the speed-torque characteristics of the motor. Thus as shown in FIG. 6, the selection of a resistor value of resistor 17b allows obtaining the air-volume-static-pressure characteristics which produces no substantial changes in the air volume even if a pressure loss changes, e.g. a change occurs in an outer wind-pressure or in a duct length. As shown in FIG. 7, another air-volume-static-pressure characteristics, which can slightly increase the air volume at a greater pressure loss, is obtainable.

Since rectifying circuit 9 rectifies the AC voltage in a full-wave manner, smoothing capacitor 18 of fairly small capacitance can be used, so that a solid capacitor such as polymer capacitor or film capacitor can be used as smoothing capacitor 18 instead of electrolytic capacitor of which characteristics are changed by a temperature. Even if smoothing capacitor 18 has small capacitance, current control circuit 16 can control a current to be supplied to inverter circuit 6 at typically a constant level, so that torque ripples or irregular rotation can be suppressed.

Magnetism sensor 4a is placed through adjusting a space between sensor 4a and magnet rotor 3 so that a waveform to be sensed can be substantially similar to a voltage induced on driving coil 2. Current waveform control circuit 7 runs a current, which is substantially similar to a magnetic density distribution waveform, on driving coil 2, thereby suppressing torque ripples to a lower level. Magnet rotor 3 is formed of polar-anisotropic magnet 3a, then the induced voltage waveform and the current electric wave form can be sine-wave, therefore, torque ripples can be further reduced.

Waveform synthesizer circuit 12 synthesizes the waveforms of phase-U, phase-V and phase-W of magnetism sensor 4a, so that harmonic components included in the magnetic flux distribution waveform can be removed, thereby suppressing irregular rotation.

Since the motor is molded into one body with thermosetting resin 27, smoothing capacitor 18 can be protected with ease from degradation due to absorption of humidity. On top of that, components which form voltage converting circuit 8 and tend to generate heat, such as switching elements, diodes, and coils, can be suppressed their temperature rises.

The waveform of the current supplied to driving coil 2 can be excited at 120°, 140°, or 150° upon necessity. In the case of providing switching elements Q1-Q6 with PWM control, loss of the switching elements can be reduced, so that a wider range of load torque can be available. A resistor value of resistors 17b and 17a connected to correlation indication circuit 13 and reference current indication circuit 20 can be set inside the motor.

Figure 8:
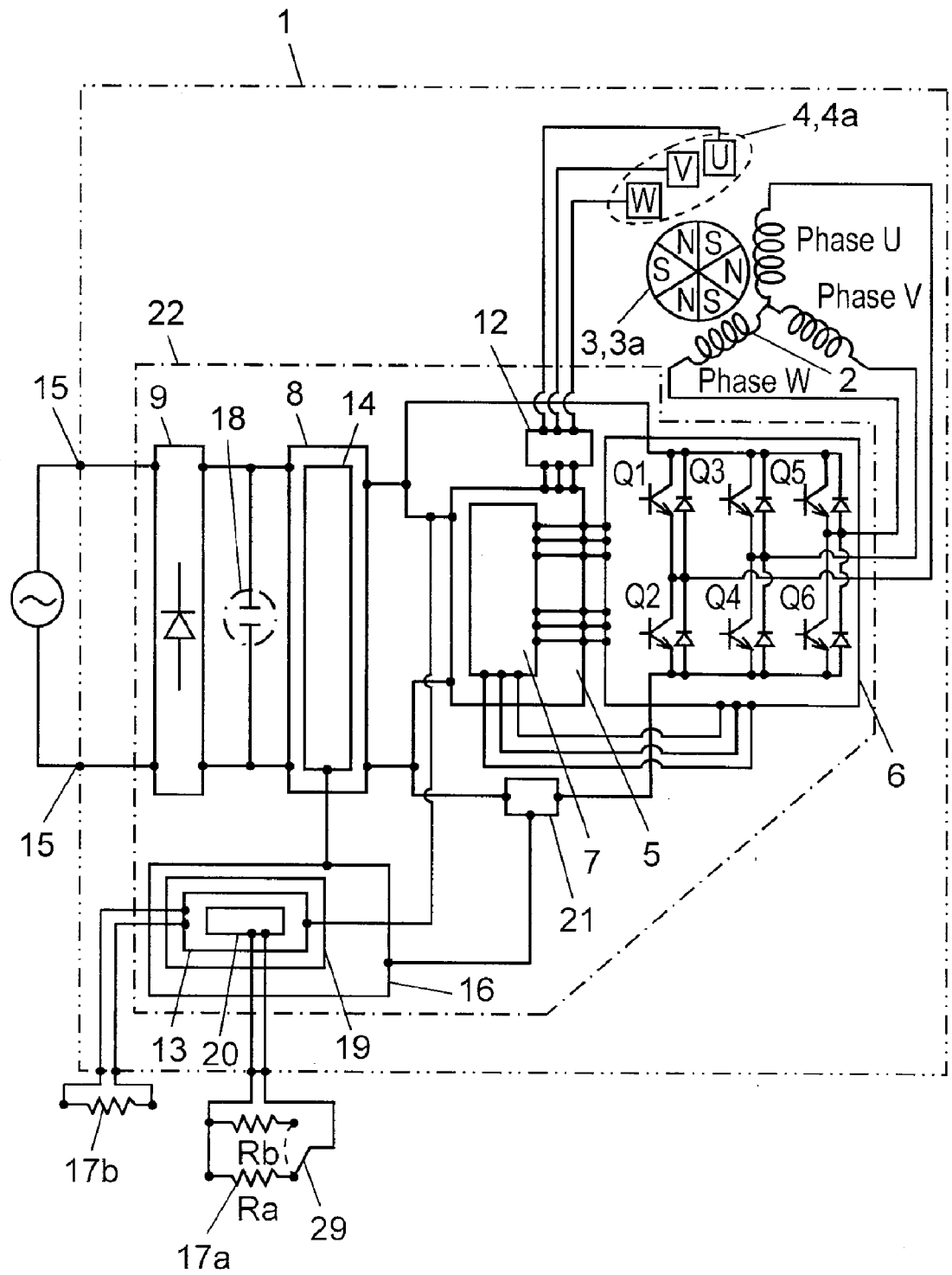
FIG. 8 shows another block diagram of the brushless DC motor.

As shown in FIG. 8, the resistor value of resistor 17a connected to reference current indication circuit 20 is switched by outside switch 29, so that the air volume of ventilating device 28 can be switched over. In a similar way, the resistor value of resistor 17b connected to correlation indication circuit 13 is switched, thereby switching the air volume of ventilating device 28.

In this first embodiment, a ventilating device is taken as an example of an electric appliance that employs the AC-input type brushless DC motor. However, use of the AC-input type brushless DC motor of the present invention is not limited to the ventilating device, but it can be used in various electric appliances such as blowers, dehumidifiers, humidifiers, air-conditioners, hot-water suppliers, and fan-filter units.

Exemplary Embodiment 2

Figure 9:
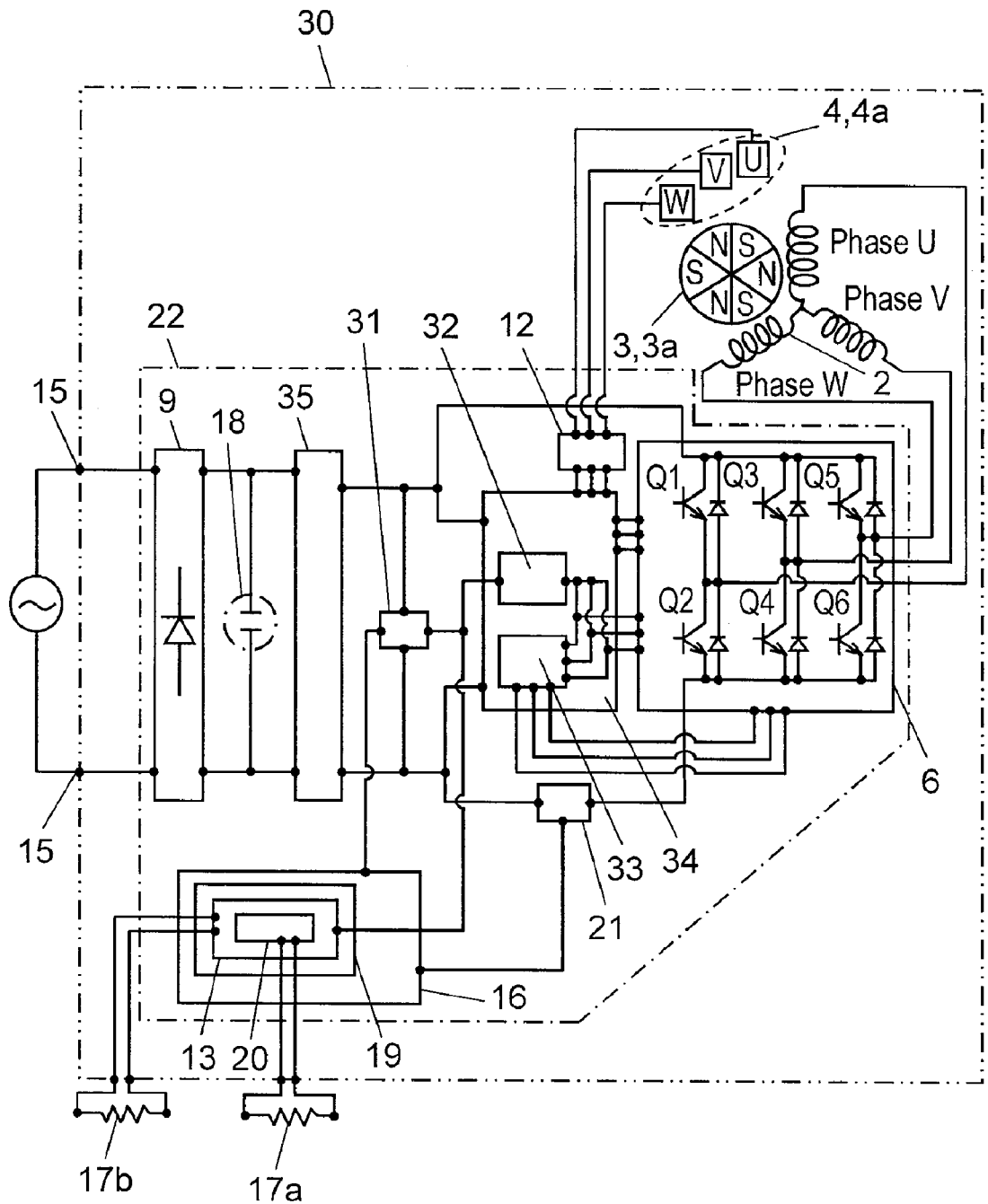
FIG. 9 shows a block diagram of an AC-input type brushless DC motor in accordance with a second embodiment of the present invention.

FIG. 9 shows AC-input type brushless DC motor 30 in accordance with the second embodiment. Brushless DC motor 30 works in the same way as brushless DC motor 1 described in the first embodiment except that the motor current undergoes PWM control. In FIG. 9, elements common to those of brushless DC motor 1 demonstrated in the first embodiment have the same reference marks and the detailed descriptions thereof are omitted here.

In FIG. 9, driving logic circuit 34 of DC motor 30 includes PWM control circuit 32 that provides lower side switching elements Q2, Q4, and Q6 with PWM control, and current waveform control circuit 33. Control circuit 33 adjusts an on-off duty of switching elements Q2, Q4, and Q6 while carrying out a feedback control such that current waveforms of respective phases of driving coil 2 become similar to the waveform where harmonic component is removed by waveform synthesizer circuit 12. Voltage converting circuit 35 is formed of a chopper circuit and outputs a low DC voltage at a constant level. Duty indication circuit 31 outputs a duty indication voltage that indicates an on-off duty of PWM control circuit 32.

Figure 10:
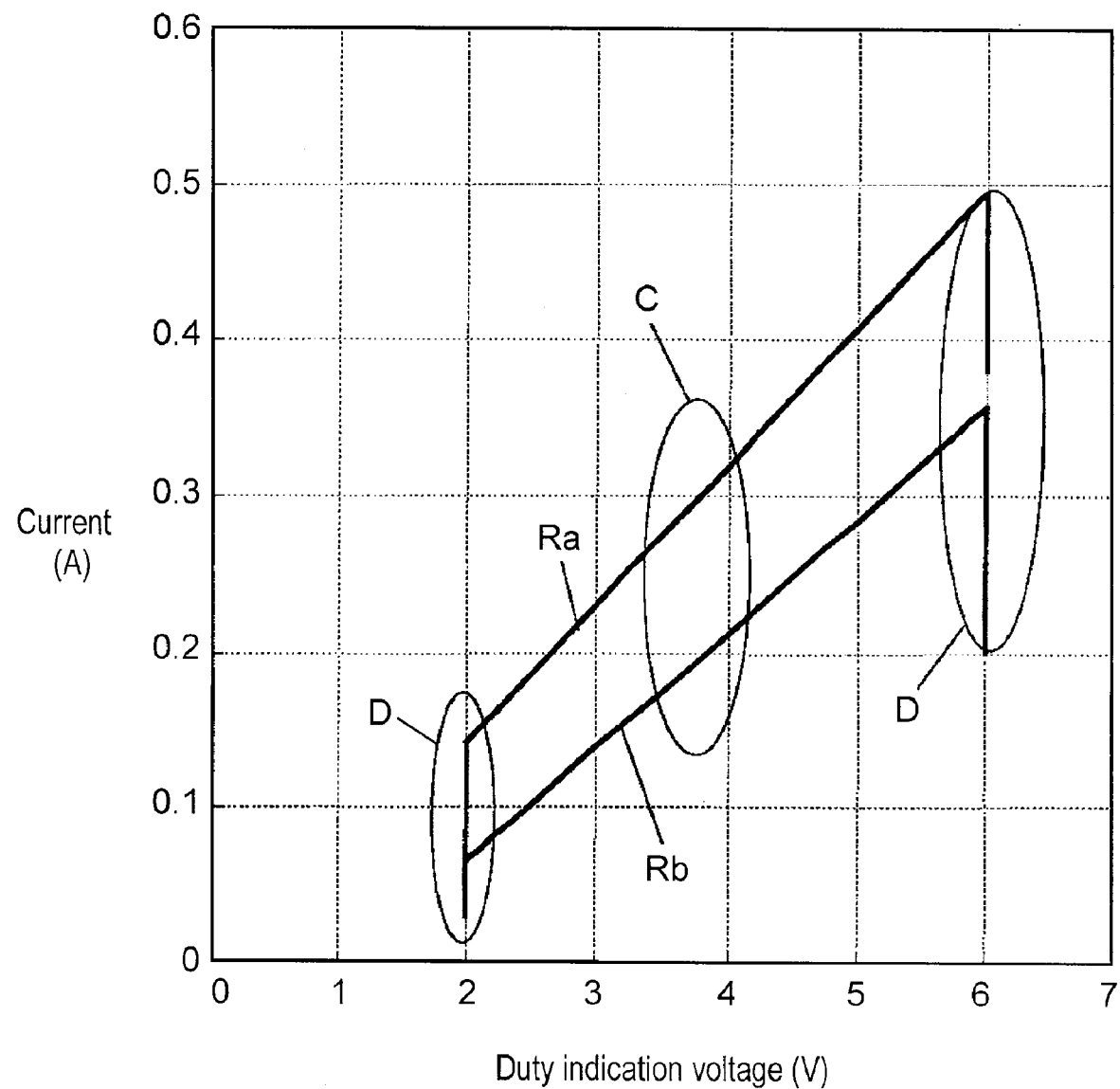
FIG. 10 shows duty-indication-voltage-current characteristics of the brushless DC motor shown in FIG. 9.
Figure 11:
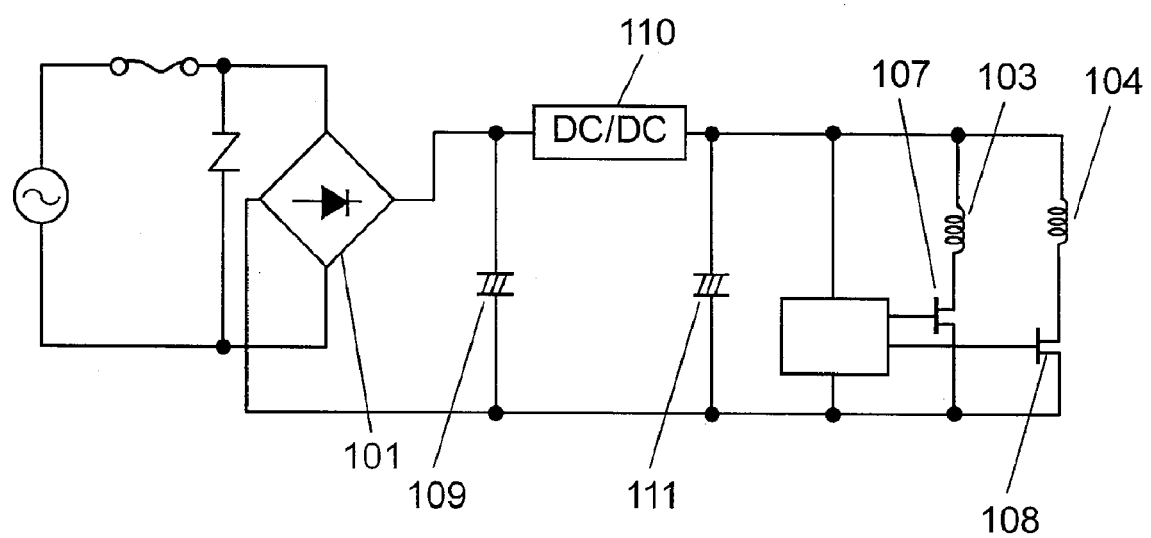
FIG. 11 shows a circuit diagram of a conventional AC-input type brushless DC motor.
Figure 12:
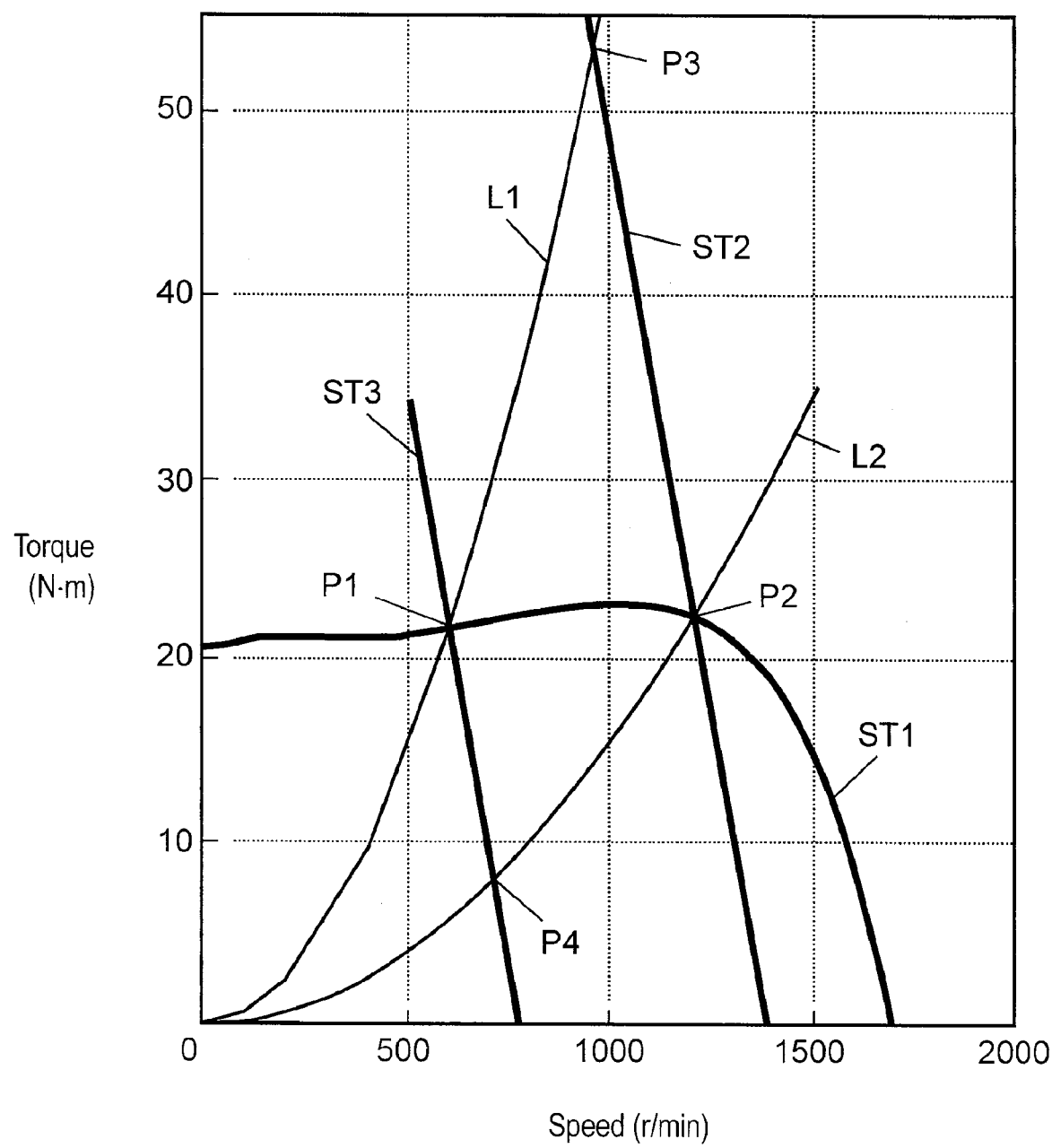
FIG. 12 compares a brushless DC motor and an induction motor when both of the motors drive a fan.
Figure 13:
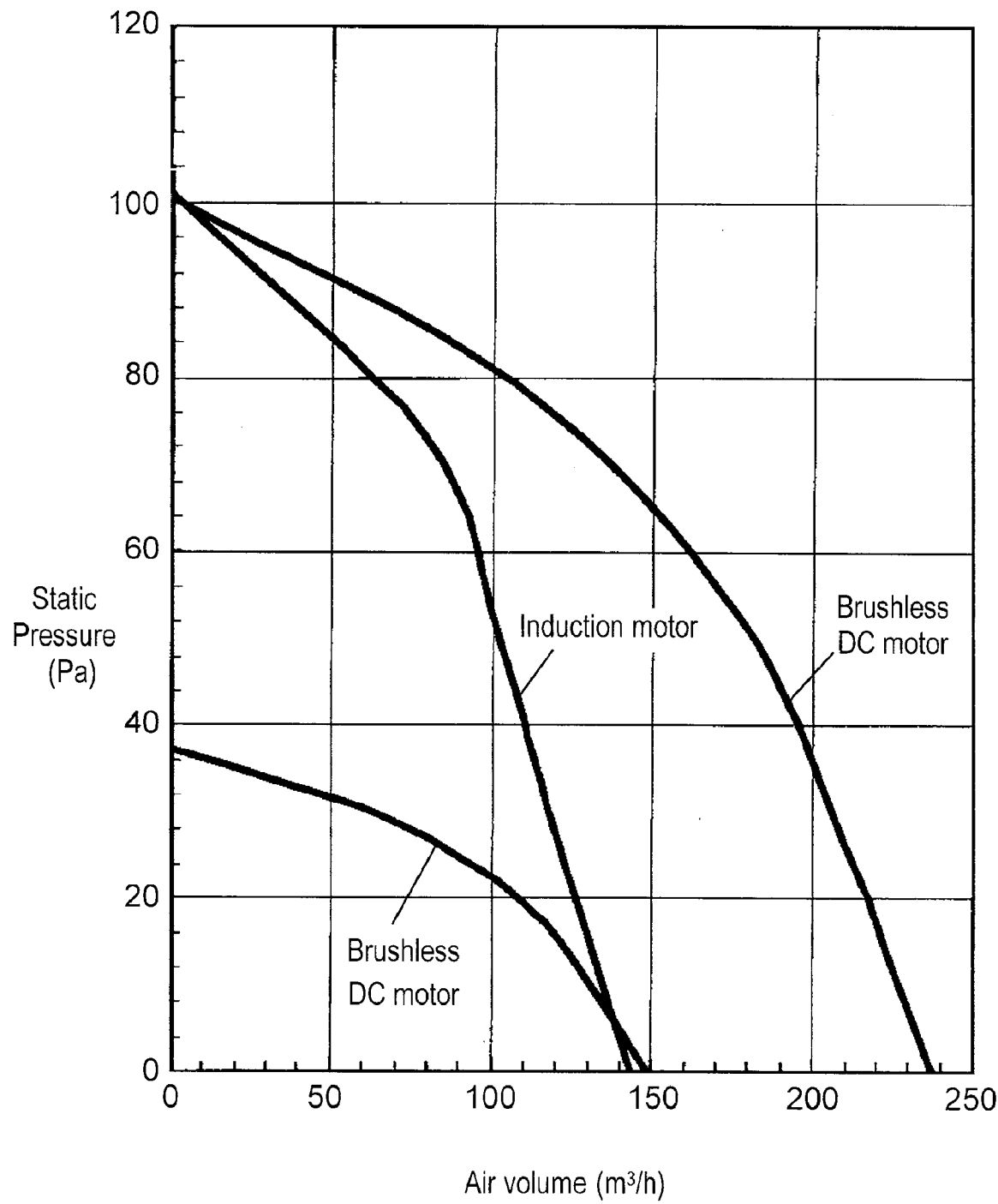
FIG. 13 shows air-volume-static-voltage of the fan in accordance with the second embodiment.

In response to a duty indication voltage, correlation indication circuit 13 makes addition or subtraction, with respect to the reference value, to the current to be supplied to inverter circuit 6, and leaves instructions for current indication circuit 19 to correlate the duty indication voltage with the current running through voltage converting circuit 35 for forming the correlation as shown in FIG. 10.

The foregoing structure allows brushless DC motor 30 to obtain the speed-torque characteristics in which torque becomes greater at a higher speed. On top of that, PWM on-duty is set to be 100% at an upper limit of the current supplied to inverter circuit 6, and an operating period, where motor 30 is driven with on-duty 100% maintained, is prepared.

INDUSTRIAL APPLICABILITY

An AC-input type brushless DC motor of the present invention is useful to be mounted in a ventilating device which invites a fairly small change in air volume even if a great change occurs in a static pressure.

The invention claimed is:

1. An AC-input type brushless DC motor comprising:
a stator formed by winding a driving coil on a stator iron core via an insulator;
a magnet rotor including a permanent magnet rotatably disposed to face the stator;
a magnet position sensing circuit for sensing a magnet position of the magnet rotor;
a rectifying circuit for rectifying an AC power supply in a full-wave manner;
an inverter circuit provided top and bottom sides, the inverter circuit being formed of a plurality of switching elements bridge-connected together;
a low DC voltage converting circuit, formed of a chopper circuit, for converting a high DC voltage obtained through the rectifying circuit into a substantially constant low DC voltage to be applied to the inverter circuit;

a driving logic circuit for exciting the driving coils in a predetermined direction and sequence with the low DC voltage produced by the low DC voltage converting circuit in the full-wave manner via the inverter circuit based on a signal supplied from the magnet position sensing circuit;

a current control circuit for controlling an average current to be supplied to the inverter circuit at a constant level;

a current indication circuit for indicating a value of the average current supplied by the current control circuit at a constant level;

a correlation indication circuit for indicating a correlation between the low DC voltage produced by the low DC voltage converting circuit and the value of the average current indicated by the current indication circuit in response to a value of a resistor to be connected; and a reference current indication circuit for determining a reference current value which is indicated by the current indication circuit in response to the value of the resistor to be connected, wherein the current indication circuit makes addition or subtraction, with respect to a reference current value determined by the current indication circuit, such that the average current falls into a correlation indicated by a correlation indication circuit.

2. The AC-input type brushless DC motor of claim 1, wherein the permanent magnet of the magnet rotor is a polar-anisotropic magnet.

3. The AC-input type brushless DC motor of claim 1, wherein the resistor to be connected to the correlation indication circuit is coupled outside the motor.

4. The AC-input type brushless DC motor of claim 1, wherein the resistor to be connected to the reference current indication circuit is coupled outside the motor.

5. An electric appliance employing the AC-input type brushless DC motor as defined in claim 1.

6. The electric appliance of claim 5, wherein the appliance is one of a ventilating device, blower, dehumidifier, humidifier, air-conditioner, hot water supplier, and fan filter unit.

7. An AC-input type brushless DC motor comprising:
a stator formed by winding a driving coil on a stator iron core via an insulator;
a magnet rotor including a permanent magnet rotatably disposed to face the stator;
a magnet position sensing circuit for sensing a magnet position of the magnet rotor;
an inverter circuit provided top and bottom sides, the inverter circuit being formed of a plurality of switching elements bridge-connected together;
a driving logic circuit for providing upper or lower switching elements with PWM control, exciting the driving coils in a predetermined direction and sequence with the low DC voltage in the full-wave manner based on a signal supplied from the magnet position sensing circuit;
a rectifying circuit for rectifying an AC power supply in a full-wave manner;
a low DC voltage converting circuit, formed of a chopper circuit, for converting a high DC voltage obtained through the rectifying circuit into a substantially constant low DC voltage to be applied to the inverter circuit;
a duty indication circuit for indicating an on-off duty which provides the switching elements with PWM control by reducing the low DC voltage produced by the low DC voltage converting circuit;
a current control circuit for controlling an average current to be supplied to the inverter circuit at a constant level;

a current indication circuit for indicating a value of the average current supplied by the current control circuit at a constant level;

a correlation indication circuit for indicating a correlation between the voltage produced by the duty indication circuit and the value of the average current indicated by the current indication circuit in response to a value of a resistor to be connected; and a reference current indication circuit for determining a reference current value which is indicated by the current indication circuit in response to the value of the resistor to be connected, wherein the current indication circuit makes addition or subtraction, with respect to a reference current value determined by the current indication circuit, such that the average current falls into a correlation indicated by a correlation indication circuit.

8. An AC-input type brushless DC motor comprising:
a stator formed by winding a driving coil on a stator iron core via an insulator;
a magnet rotor including a permanent magnet rotatably disposed to face the stator;
a magnetism sensor for sensing a distribution of magnetic flux of the magnet rotor;
a rectifying circuit for rectifying an AC power supply in a full-wave manner;
an inverter circuit provided top and bottom sides, the inverter circuit being formed of a plurality of switching elements bridge-connected together;
a low DC voltage converting circuit, formed of a chopper circuit, for converting a high DC voltage obtained through the rectifying circuit into a low DC voltage to be applied to the inverter circuit;
a driving logic circuit for exciting the driving coils in a predetermined direction and sequence with the low DC voltage produced by the low DC voltage converting circuit in the full-wave manner via the inverter circuit based on a signal supplied from the magnetism sensor;
a current waveform control circuit having the magnetism sensor so that a magnetism waveform sensed by the magnetism sensor can be substantially similar to a voltage induced on the driving coil by rotating the magnet rotor, the current waveform control circuit providing the driving coil with a current substantially similar to a waveform sensed by the magnetism sensor;
a current control circuit for controlling an average current to be supplied to the inverter circuit at a constant level;
a current indication circuit for indicating a value of the average current supplied by the current control circuit at a constant level;
a correlation indication circuit for indicating a correlation between the low DC voltage produced by the low DC voltage converting circuit and the value of the average current indicated by the current indication circuit in response to a value of a resistor to be connected; and
a reference current indication circuit for determining a reference current value which is indicated by the current indication circuit in response to the value of the resistor to be connected,
wherein the current indication circuit makes addition or subtraction, with respect to a reference current value determined by the current indication circuit, such that the average current falls into a correlation indicated by a correlation indication circuit.

9. The AC-input type brushless DC motor of claim 8 further comprising a waveform synthesizer circuit for synthesizing waveforms of two phases out of waveforms sensed by the magnetism sensor, wherein the current waveform control circuit provides the driving coil with a current similar to a waveform synthesized by the waveform synthesizer circuit.

10. An AC-input type brushless DC motor comprising:
- a stator formed by winding a driving coil on a stator iron core via an insulator;
- a magnet rotor including a permanent magnet rotatably disposed to face the stator;
- a magnetism sensor for sensing a distribution of magnetic flux of the magnet rotor;
- an inverter circuit having top and bottom sides, the inverter circuit being formed of a plurality of switching elements bridge-connected together;
- a driving logic circuit for providing upper or lower switching elements with PWM control, the driving logic circuit for exciting the driving coils in a predetermined direction and sequence with the low DC voltage in the full-wave manner based on a signal supplied from the magnetism sensor;
- a rectifying circuit for rectifying an AC power supply in a full-wave manner;
- a low DC voltage formed of a chopper circuit, converting circuit for converting a high DC voltage obtained through the rectifying circuit into a substantially constant low DC voltage to be applied to the inverter circuit;
- a duty indication circuit for indicating an on-off duty which provides the switching elements with PWM control by reducing the low DC voltage produced by the low DC voltage converting circuit;
- a current waveform control circuit having the magnetism sensor so that a magnetism waveform sensed by the magnetism sensor can be substantially similar to a voltage induced on the driving coil by rotating the magnet rotor, the current waveform control circuit providing the driving coil with a current substantially similar to a waveform sensed by the magnetism sensor;
- a current control circuit for controlling an average current to be supplied to the inverter circuit at a constant level;
- a current indication circuit for indicating a value of the average current supplied by the current control circuit at a constant level;
- a correlation indication circuit for indicating a correlation between the voltage produced by the duty indication circuit and the value of the average current indicated by the current indication circuit in response to a value of a resistor to be connected;
- a reference current indication circuit for determining a reference current value which is indicated by the current indication circuit in response to the value of the resistor to be connected,
- wherein the current indication circuit makes addition or subtraction, with respect to a reference current value determined by the current indication circuit, such that the average current falls into the correlation indicated by the correlation indication circuit.

* * * * *